UNITED STATES PATENT OFFICE.

JOHN WM. BALL, OF WOODBINE, WEST VIRGINIA.

BRAZING COMPOUND.

No. 803,802. Specification of Letters Patent. Patented Nov. 7, 1905.

Application filed June 14, 1905. Serial No. 265,274.

*To all whom it may concern:*

Be it known that I, JOHN WM. BALL, a citizen of the United States, residing at Woodbine, in the county of Nicholas and State of West Virginia, have invented a new and useful Brazing Compound, of which the following is a specification.

This invention relates to brazing compounds.

The object of the invention is to provide a brazing compound adapted more particularly for use in brazing band-saws, which in use will be thoroughly effective in causing the solder to flow, which will positively preclude oxidation, which shall be cheap and ready of application, and which will not deteriorate with time.

With the above and other objects in view, as will appear as the nature of the invention is better understood, the same consists in the novel brazing compound hereinafter fully described and claimed.

The compound consists of the following ingredients substantially in the proportions stated, by weight: six ounces of muriatic acid, chemically pure; one and one-half ounces of pure zinc; one ounce of pulverized borax; two ounces of boiled water.

In making the compound the borax is placed in the water and allowed to remain for a sufficient length of time to cause it entirely to dissolve. The water should be fresh spring or rain water free from iron or sulfur and should, as stated, be boiled prior to use. The zinc is placed in the muriatic acid and allowed to stand until the former is entirely dissolved or taken up by the acid, after which the borax solution is added to the muriate of zinc, and the whole is then strained through a fine white cloth, which will remove any sediment and also any foreign substance that might detract from the properties of the compound. Prior to bottling a suitable coloring material is added, preferably one that is blue, to give the solution a distinctive color which will prevent mistakes in use.

In using the solution it is applied to the surfaces of the saw to be united and is allowed to stand for a minute or more and is then wiped off with a dry clean cloth. Next the solder, which may be silver solder, is placed between the laps of the saw and a little more of the solution is added to the parts, and brazing-irons heated to about 1,800° or 2,000° Fahrenheit are then applied to the laps, this heat being sufficient to cause the solder to flow and present a neat and finished joint. As an extra precaution to secure absolute cleanliness of the solder, it may be cleaned by use of fine sandpaper, after which the solution will be applied as a wash, and before the solder is placed between the laps a small quantity of the solution will be applied to both the saw and to the solder.

Having thus described the invention, what is claimed is—

A brazing compound consisting of the following ingredients by weight: muriatic acid six parts, zinc one and one-half parts, water two parts, and pulverized borax one part.

In testimony that I claim the foregoing as my own I have hereto affixed my signature in the presence of two witnesses.

JOHN WM. BALL.

Witnesses:
   E. E. AMSLER,
   H. L. MILLER.